United States Patent
Ahmed et al.

(10) Patent No.: US 10,726,010 B2
(45) Date of Patent: Jul. 28, 2020

(54) OPTIMIZATION TECHNIQUE OF GENERALIZED DISJUNCTIVE SEMI/ANTI JOIN

(75) Inventors: Rafi Ahmed, Fremont, CA (US); Chun-Chieh Lin, San Jose, CA (US); Mohamed Zait, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 667 days.

(21) Appl. No.: 13/603,302

(22) Filed: Sep. 4, 2012

(65) Prior Publication Data

US 2014/0067789 A1    Mar. 6, 2014

(51) Int. Cl.
 *G06F 16/2453* (2019.01)

(52) U.S. Cl.
 CPC .............. *G06F 16/24544* (2019.01)

(58) Field of Classification Search
 None
 See application file for complete search history.

(56) References Cited

U.S. PATENT DOCUMENTS

| | | | | |
|---|---|---|---|---|
| 5,732,258 | A * | 3/1998 | Jakobsson | G06F 17/30451 |
| 5,761,657 | A * | 6/1998 | Hoang | |
| 6,615,203 | B1 | 9/2003 | Lin et al. | |
| 6,748,392 | B1 * | 6/2004 | Galindo-Legaria | G06F 16/24544 |
| 6,826,562 | B1 * | 11/2004 | Leung et al. | 707/713 |
| 2002/0059191 | A1 * | 5/2002 | Tamura | 707/2 |
| 2002/0188600 | A1 * | 12/2002 | Lindsay | G06F 17/30466 |
| 2003/0055814 | A1 * | 3/2003 | Chen et al. | 707/3 |
| 2004/0220923 | A1 | 11/2004 | Nica | |
| 2005/0071326 | A1 * | 3/2005 | Brown et al. | 707/3 |
| 2005/0097099 | A1 | 5/2005 | Kapoor et al. | |
| 2006/0167865 | A1 * | 7/2006 | Andrei | G06F 17/30466 |

(Continued)

OTHER PUBLICATIONS

U.S. Appl. No. 13/481,722, filed May 25, 2012, Notice of Allowance, dated Jun. 11, 2013.

(Continued)

*Primary Examiner* — Charles D Adams
(74) *Attorney, Agent, or Firm* — Hickman Palermo Becker Bingham

(57) ABSTRACT

A method, apparatus, and stored instructions are provided for transforming a query representation by unnesting a predicate condition that is based on whether or not a result exists for a subquery of the predicate condition. An initial query representation is received. The initial query representation represents an initial query that includes an EXISTS-equivalent predicate or a NOT-EXISTS-equivalent predicate and at least one other predicate in a disjunction. The initial query representation is transformed into a semantically equivalent transformed query representation that represents a transformed query. The transformed query includes, instead of the EXISTS-equivalent predicate or a NOT-EXISTS-equivalent predicate, a join operator that references the data object. The transformed query representation, when used for execution, causes the at least one other predicate to be applied separately from a join operation caused by the join operator such that execution of the initial representation is semantically equivalent to execution of the transformed representation.

18 Claims, 3 Drawing Sheets

(56) References Cited

U.S. PATENT DOCUMENTS

| | | |
|---|---|---|
| 2006/0230017 A1 | 10/2006 | Larson et al. |
| 2007/0038618 A1* | 2/2007 | Kosciusko et al. ............... 707/4 |
| 2007/0219952 A1* | 9/2007 | Ahmed et al. .................... 707/2 |
| 2008/0071785 A1* | 3/2008 | Kabra et al. ...................... 707/9 |
| 2009/0070315 A1* | 3/2009 | Ahmed et al. .................... 707/5 |
| 2010/0030756 A1* | 2/2010 | Ahmed et al. .................... 707/4 |
| 2011/0137890 A1* | 6/2011 | Bestgen et al. ............... 707/719 |
| 2012/0317096 A1* | 12/2012 | Kaufmann et al. ........... 707/718 |

OTHER PUBLICATIONS

U.S. Appl. No. 13/552,419, filed Jul. 18, 2012, Notice of Allowance, dated May 28, 2013.

\* cited by examiner

FIG. 1

RECEIVE AN INITIAL QUERY REPRESENTATION THAT REPRESENTS AN INITIAL QUERY THAT INCLUDES: AN EXISTS-EQUIVALENT PREDICATE THAT REFERENCES A DATA OBJECT THAT IS INITIALLY REFERENCED OUTSIDE OF THE EXISTS-EQUIVALENT PREDICATE, AND AT LEAST ONE OTHER PREDICATE
100

TRANSFORM THE INITIAL QUERY REPRESENTATION INTO A SEMANTICALLY EQUIVALENT TRANSFORMED QUERY REPRESENTATION THAT REPRESENTS A TRANSFORMED QUERY INCLUDING, INSTEAD OF THE EXISTS-EQUIVALENT PREDICATE, A JOIN OPERATOR THAT REFERENCES THE DATA OBJECT
102

CAUSE THE AT LEAST ONE OTHER PREDICATE TO BE APPLIED SEPARATELY FROM A JOIN OPERATION CASED BY THE JOIN OPERATOR SUCH THAT THE INITIAL REPRESENTATION, IF EXECUTED, WOULD BE SEMANTICALLY EQUIVALENT TO THE TRANSFORMED REPRESENTATION
104

OPTIMIZATION TECHNIQUE OF GENERALIZED DISJUNCTIVE SEMI/ANTI JOIN

CROSS-REFERENCE TO RELATED APPLICATIONS

This application is related to (1) U.S. Pat. No. 7,702,627, entitled "EFFICIENT INTERACTION AMONG COST-BASED TRANSFORMATIONS," by Rafi Ahmed and Allison Lee, filed Mar. 8, 2007, the contents of which is hereby incorporated by reference herein in its entirety; (2) U.S. Patent Application Publication Number 2005/0283471, entitled "MULTI-TIER QUERY OPTIMIZATION," by Rafi Ahmed, published Dec. 22, 2005, the contents of which is hereby incorporated by reference herein in its entirety; (3) U.S. Pat. No. 5,732,258, entitled "METHOD AND APPARATUS FOR EFFICIENTLY EVALUATING EXISTS AND NOT EXISTS EQUIVALENT SUBQUERIES," by Hakan Jakobsson and Atif Chaudhry, filed Feb. 8, 1996, the contents of which is hereby incorporated by reference herein in its entirety; and (4) U.S. Pat. No. 6,449,609, entitled "USING MATERIALIZED VIEW TO PROCESS A RELATED QUERY CONTAINING A ONE TO MANY LOSSLESS JOIN," by Andrew Witkowski, filed Dec. 28, 1998, the contents of which is hereby incorporated by reference herein in its entirety.

TECHNICAL FIELD

The technical field relates to transforming and optimizing representations of queries.

BACKGROUND

Query Processing

A query is an expression, command, or set of commands that, when executed, causes a server to perform operation(s) on a set of data. The operation(s) may select, group, order, filter, or otherwise process data, and the processed data may be returned as part of a result set. The query may include predicates that filter the data by placing conditions on the data that is to be included as part of the result set. One example query language is structured query language ("SQL"), but other query languages also exist and function similarly. In a SQL query, filter predicates may be specified in a WHERE clause. The query, including the filter predicates, may have been authored by a user, by an application, by a combination of a user and an application, or as a result of transformations performed by a query optimizer on the query authored by the user or the application.

A query may be processed in a predictable order by query processors. For example, the order of precedence for a SQL query may be FROM, WHERE, GROUP BY, HAVING, SELECT, and ORDER BY. Query processors may vary the order if varying the order is predicted to be more efficient as long as the varying the order would not change a result of the query.

Conditions in filter predicates may be related to each other with logical operators such as AND (for "conjunctive predicates") or OR (for "disjunctive predicates"). The predicates may also include sub-queries that require evaluation of separate select statements and may include further sub-queries. To produce a single row of a result set for an outer query, a query execution engine may store and arrange temporary data generated by sub-quer(ies) of the outer query, and the execution engine may use that data to determine what should be included in the single row of the result set. Such a process may be repeated to produce each row of the outer query. Queries with multiple predicates and one or more layers of sub-queries that are executed on large datasets may take a significant amount of computing resources (i.e., processor time and memory) to compute.

A query may include a predicate that specifies a condition that is based on whether or not a result of a subquery exists. Such predicates are referred to herein as "EXISTS-equivalent predicates," regardless of whether the query is implemented in SQL. In SQL, EXISTS and NOT EXISTS are example predicates that are based on whether or not a result of a sub-query exists. An EXISTS predicate is TRUE if a subquery of the EXISTS predicate returns at least one row. For example, the EXISTS predicate, "EXISTS (SELECT*FROM T2 WHERE T2.x>2)," would result in a TRUE value if at least one row would be returned by the sub-query, "SELECT*FROM T2 WHERE T2.x>2." In other words, the EXISTS predicate would be equivalent to TRUE if, when evaluated, column x of Table T2 includes any value that is greater than 2.

A NOT EXISTS predicate is TRUE if a subquery of the NOT EXISTS predicate does not return any rows. For example, the NOT EXISTS predicate, "NOT EXISTS (SELECT*FROM T2 WHERE T2.x>2)," would result in a TRUE value if the sub-query, "SELECT*FROM T2 WHERE T2.x>2," does not return any rows. In other words, the NOT EXISTS predicate would be equivalent to TRUE if, when evaluated, column x of Table T2 does not include any value that is greater than 2.

Queries and/or sub-queries may cause the server to perform join operations such that individual rows of the result set are based on or conditioned on data from multiple sources, such as tables, views, or snapshots. In SQL queries, a join operation may be performed whenever multiple tables ("base or view tables") appear in a FROM clause of a query. For some join operations, the first table in the join operation may be called the "left table," and the second table in the join operation may be called the "right table." The join operation produces a result set that may be stored temporarily, used in evaluating other queries, or written as a new table in a database. The result set may often be stored temporarily so that other parts of the query may select, organize, or filter data from the result set.

In query optimization, a query optimizer or other query processor may transform a representation of a query from one form to another form as long as the two forms are semantically equivalent to each other. The representation of the query may be the query expression itself or may be an internally and/or externally recognized representation of the query, such as a query execution tree or other data structure. If the representation does not include the query expression itself, the representation may include data that describes steps that may be taken to execute the query, such as an execution plan. An execution plan is a set of directives and metadata that is prepared for an execution engine. As used herein, a query representation is "transformed" when (a) the representation represents a rewritten from of the query, after the query has been rewritten from a first form to a second form, (b) the representation is received in a manner that specifies a first set of operations, such as a first form or a first execution plan, and executed or caused to be executed using a second set of operations, such as the operations specified by a second form or second execution plan, or (c) received in a manner that specifies a first set of operations, and planned for execution using a second set of operations. Two representations of queries are semantically equivalent to each other when the two representations of queries, if executed, would produce equivalent result sets, even if the result sets are assembled in different manners by the two representations. Execution of a representation of a query is semantically equivalent to the representation of the query if the execution produces a result set that is equivalent to the one that would be produced by the representation of the query, if executed.

Correlated Exists-Equivalent Predicates

A "correlated predicate" is a predicate in a query block, such as a subquery, that refers to a correlated column that occurs or is initially referenced outside of the query block. For example, a correlated predicate in a subquery may reference the other table(s) that appear in the FROM clause of an outer query as source table(s). When a correlated EXISTS-equivalent predicate appears in disjunction with certain other predicates, the correlated EXISTS-equivalent subquery is typically evaluated once for each row produced by the outer query. In the absence of any indexes on the local columns in correlated predicates, the evaluation of subquery becomes tantamount to doing Cartesian product, which leads to a sub-optimal execution plan and extremely poor performance.

Join Operations

The manner in which tables are joined can affect the outcome of the query. Example types of join operations include semi-join (rows from the left table that match a condition based on the right table), anti-join (rows from the left table that do not match a condition based on the right table), inner join (rows from left and right tables after removal of non-matching rows from the left and right tables), left outer join (rows from left and right tables after removal of non-matching rows from the right table), right outer join (rows from left and right tables after removal of non-matching rows from the left table), and cross join (every row from left table paired with every row from right table).

Example methods of join include hash, sort-merge, index access, and nested-loops joins. The method used for joining two tables does not affect the outcome of the query. The type of join operation may be specified in the FROM clause or in the WHERE clause of the query. The method of join is generally left up to the query optimizer to determine, for example, based on a cost-analysis of the methods available for the query.

A cross-join produces a result set that is produced by taking a Cartesian product of all rows in the sources. In other words, for a cross-join of left table T1 and right table T2, every row in T1 would be combined with every row in T2. Computing the Cartesian product is an expensive operation that uses an order of n*m resources to compute, where n is the number of rows in table T1 and m is the number of rows in table T2.

If the specified type of join is not a cross-join, computation of the join operation may avoid the complex computation of a Cartesian product of all rows in the sources. Many database systems support American National Standards Institute (ANSI) syntax for specifying types of joins that are performed on the tables. Different types of joins often produce different result sets by including, duplicating, excluding, or null-padding different sets of rows from the sources. A row is said to be "null-padded" if values in the row are changed to null. A row may be null-padded if the row is included in the result set even though the row does not satisfy a join predicate.

A semi-join between left table T1 and right table T2 on condition P results in another table that includes the rows from T1 that match the condition P. Typically, the condition of a semi-join requires that a column from the left table match the value of a column in the right table. An example condition for a semi-join is "T1.a=T2.b," where "a" is any column of T1 and "b" is any column of T2. When evaluating a semi-join, rows from T1 that match the condition are added to the semi-join table, and rows from T1 that do not match the condition are not added to the semi-join table. Also excluded from the table are rows from T2. In the example, if a value "5" is in a current row of T1.a, then the current row is added to the semi-join table if "5" is in any row of T2.b.

An anti-join between left table T1 and right table T2 on condition P results in another table that includes the rows from T1 that do not match the condition P. Typically, the condition of an anti-join requires that a column from the left table does not match the value of a column in the right table. An example condition for an anti-join is "T1.a=T2.b," where "a" is any column of T1 and "b" is any column of T2. When evaluating an anti-join, rows from T1 that do not match the condition are added to the anti-join table, and rows from T1 that do match the condition are not added to the anti-join table. Also excluded from the table are rows from T2. In the example, if a value "5" is in a current row of T1.a, then the current row is excluded from the anti-join table if "5" is in any row of T2.b; otherwise, the row is added to the anti-join table.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 illustrates an example process for transforming a representation of a query by unnesting a predicate condition that is based on whether or not a result exists for a subquery of the predicate condition.

DETAILED DESCRIPTION

Figure 2:
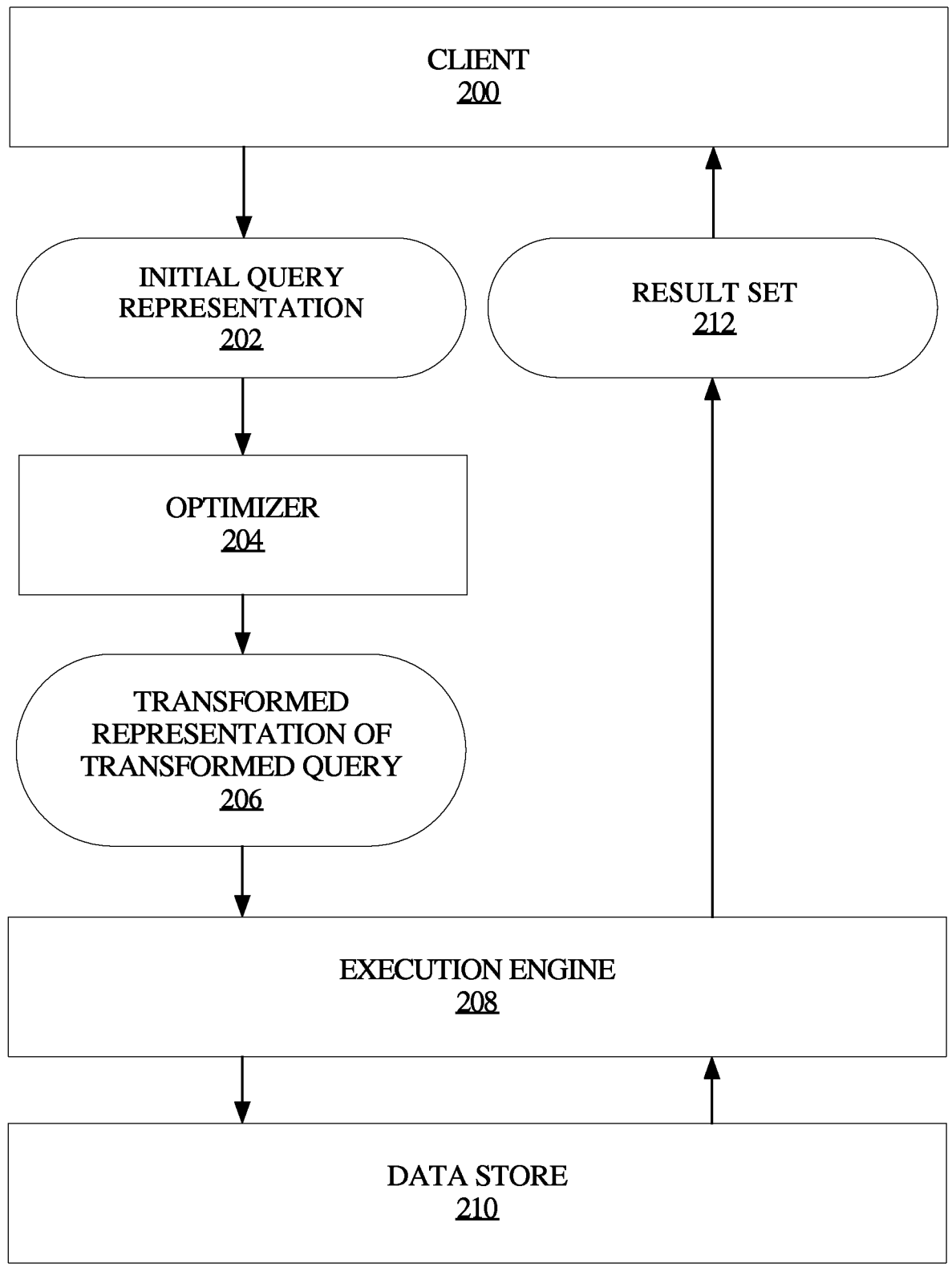
FIG. 2 illustrates an example server-client system for transforming and executing a representation of a query.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for transforming a representation of a query by unnesting a predicate condition that is based on whether or not a result exists for a subquery of the predicate condition. In one embodiment, a query processor transforms an initial representation of an initial query that includes predicate condition(s) in disjunction with a particular predicate condition. The particular predicate condition is based on whether a result exists for a subquery of the particular predicate condition. For example, the particular predicate condition may specify a SQL EXISTS or NOT EXISTS operator and a sub-query of the EXISTS or NOT EXISTS operator. The subquery references data object(s) such as column(s) of table(s), view(s), or snapshot(s), and the referenced data object(s) may include object(s) that occur or are initially referenced outside of the subquery. In other words, the initial representation represents an initial query that may contain a correlated EXISTS-equivalent predicate.

The query processor generates a transformed representation of a given query. The transformed query includes, instead of the particular predicate condition, a join operator that references the data object(s) that were previously referenced in the sub-query. For example, the join operator may be a semi-join or an anti-join that references the data object(s) that were previously referenced in the sub-query. The semi-join operator as represented in the transformed representation may be referred to as a generalized disjunctive semi-join ("GDSJ") because the transformed representation, when executed, causes the predicate condition(s) to be applied separately from the semi-join operation. Similarly, the anti-join operator as represented in the transformed representation may be referred to as a generalized disjunctive anti-join ("GDAJ") because the transformed representation, when executed, causes the predicate condition(s) to be applied separately from the anti-join operation.

The query processor then causes the predicate condition(s) to be applied separately from a join operation caused by the join operator such that execution of the initial representation is semantically equivalent to execution of the transformed representation. For example, the semi-join or anti-join operation may be applied before or after the at least one predicate condition. If the join operation is applied after disjunctive predicate condition(s), some of which are satisfied, then the join operation may be evaluated for fewer than all of the rows in the data object(s). In other words, if the predicate condition(s) evaluate to TRUE for certain row(s) of base table(s), then those rows may be excluded from the join operation that is caused by the join operator because the disjunctive predicate has already been satisfied.

In one embodiment, the query processor causes the predicate condition(s) to be applied separately from the join operation by setting a flag or storing some other indication that is accessible to the query execution engine such that the query execution engine applies the predicate condition(s) in response to detecting the flag or other stored indication. The query processor may use any mechanism, such as the flag or other stored indication, to mark a joined table with an indication that the predicate condition(s) should be applied to the table separately from the join operation. In one example, a flag may be stored in association with a base table in a query tree structure. The base table may be the base table that previously appeared in a FROM clause of the sub-query as it appeared in the initial query.

In another example, syntactical marking(s), such as parentheses, may be added to a query expression for a transformed query to mark the predicate condition(s) that should be applied to the joined table separately from the join operation. One form of such syntactical markings are the parentheses in "FROM T1, T2 (P)" for a FROM clause of a query, where P is a predicate(s) that was in disjunction with an EXISTS-equivalent predicate in an initial query. In one embodiment, a query language such as SQL may be extended to accommodate such a syntactical marking in the native form of the language. In another embodiment, the syntactical marking is expressed as an internal representation of the query that may not conform to the query language.

The query processor may store the transformed query in temporary storage and send the transformed query to the query execution engine for execution. In addition to sending the transformed query, the query processor may also send the flag or other stored indication that the predicate condition(s) are to be applied separately from the join operation that is specified by the join operator. Rather than sending the transformed query itself, the query processor may instead store and send, to the query execution engine, information such as a query execution tree or other transformed representation that describes the transformed query. The information may cause the query execution engine to apply the predicate condition(s) to the data object(s) separately from the join operation.

In one embodiment, the particular predicate condition includes an ANY, ALL, IN, or NOT IN operator and the subquery. The ANY, ALL, IN, or NOT IN predicates may be treated as EXISTS or NOT EXISTS predicates with additional transformation. Various examples of transforming between EXISTS-equivalent predicates are provided in U.S. Pat. No. 5,732,258, which has been incorporated by reference herein in its entirety. For example, an IN predicate, "T1.x IN (SELECT T2.x FROM T2)," is equivalent to an ANY predicate, "T1.x=ANY (SELECT T2.x FROM T2)," which is also equivalent to an EXISTS predicate, "EXISTS (SELECT*FROM T2 WHERE T1.x=T2.x)." Similarly, a NOT IN predicate, "T1.x NOT IN (SELECT T2.x FROM T2)," is equivalent to an ALL predicate, "T1.x !=ALL (SELECT T2.x FROM T2)," which is also equivalent, under certain conditions, to a NOT EXISTS predicate, "NOT EXISTS (SELECT*FROM T2 WHERE T1.x=T2.x)."

In one embodiment, the query processor receives the initial query representation, which may be the initial query itself, for execution or for optimization and then execution. In response to receiving the initial query representation, the query processor generates a transformed query representation, such as an execution plan for executing a transformed query instead of the initial query. In the same or another embodiment, in response to receiving the initial query representation, the query processor executes or causes execution of the transformed query representation instead of the initial query representation.

In one embodiment, a query execution engine receives a query representation that marks a table with predicate(s) using a flag or some other stored indication. For example, the marking may indicate that the predicate(s) are marked disjunctive predicates should be used to filter rows from a base table before performing a join operation on the base table. The query representation joins the table using a join operation such as a semi-join or anti-join. The query execution engine executes the query representation by applying, based on the flag or other stored indication, the predicate(s) separately from the join operation that joins the table. For example, the query execution engine may call a function that determines whether or not the table has been marked with disjunctive predicate(s). If the disjunctive predicate(s) evaluate to TRUE for certain row(s) of base table(s) of the join operation, then those rows may be excluded from the join operation because the predicate(s) are marked disjunctive predicate(s) that have already been satisfied. In response to executing the query representation, the query execution engine may return result(s) to a client.

The techniques may be implemented as steps that are performed by computing device(s). The computing device(s) may be specially configured to perform the steps, for example, by including specialized hardware and/or specialized software. Alternatively, one or more non-transitory computer-readable media may store specialized instructions for causing computing device(s) to perform the steps.

FIG. 1 illustrates an example process for transforming a query representation by unnesting a predicate condition that is based on whether or not a result exists for a sub-query of the predicate condition. The process may be carried out by computing device(s) that are specially configured to perform the steps. In the example, an initial query representation is received in step 100. The initial query representation represents an initial query that includes: an EXISTS-equivalent predicate that references a data object that occurs or is initially referenced outside of the EXISTS-equivalent predicate, and at least one other predicate in a disjunction. In step 102, the initial query representation is transformed into a semantically equivalent transformed query representation that represents a transformed query. The transformed query includes, instead of the EXISTS-equivalent predicate, a join operator that references the data object. The process further includes, in step 104, causing the at least one other predicate to be applied separately from a join operation caused by the join operator such that the initial representation, if executed, would be semantically equivalent to the transformed representation. Step 104 may include generating the transformed representation and storing the transformed representation in a manner that is accessible to a query execution engine. Optionally, the transformed representation may be sent to the query execution engine for execution.

FIG. 2 illustrates an example server-client system for transforming and executing a query. In the example, client 200 sends an initial query representation 202, such as a query expression itself that conforms to a query language such as SQL, to optimizer 204. As shown, optimizer 204 is separate from execution engine 208. Optimizer 204 and execution engine 208 may operate on same or different devices and may have a high amount or low amount of integration with each other. Optimizer 204 transforms the initial query representation to generate a transformed representation of a transformed query 206. The transformed representation may or may not include an actual query expression that conforms to the query language. Before transforming the initial query, optimizer 204 may analyze initial query representation 202 to determine whether initial query representation 202 is a cost-effective candidate for such a transformation. Optimizer sends the transformed representation of the transformed query 206 to execution engine 208. Execution engine 208 then executes the transformed representation 206 against data store 210 and returns result set 212 to client 200.

Cost-Based Transformation

In one embodiment, a query processor determines how to transform a query representation based at least in part on the costs of evaluating different predicates. The query processor may compare expected costs for evaluating different predicates in the query representation. If the most expensive predicate in the query representation is an EXISTS-equivalent predicate that contains a sub-query, then the query processor may transform the query representation to unnest the EXISTS-equivalent predicate. If the most expensive predicate is not the EXISTS-equivalent predicate, but, rather, some other predicate, then the query processor may choose not to unnest the EXISTS-equivalent predicate. For example, another predicate may also include a nested sub-query, and the query processor may determine whether the other predicate can be unnested using another unnesting technique. If the query contains multiple predicates that contain sub-queries, the query processor may still transform an EXISTS-equivalent predicate if the predicted cost of executing the query is lower as a result of such a transformation. The query processor has limited computational resources such as limited processor time and limited memory with which to make cost-based determinations.

The query processor may choose a transformed representation for a transformed query in response to receiving an initial representation of an initial query. The transformed representation may be executed more efficiently or otherwise differently, for example, by using fewer computing resources such as processor time and/or memory. Alternatively, the transformed representation may be predicated to execute more efficiently or otherwise differently, regardless of actual execution. The transformed query may include a GDSJ or GDAJ that supports all the four join methods: hash, sort-merge, index access, and nested-loop joins. Further, disjunctive filter predicates on the left tables may be evaluated before performing the semi-join or anti-join; for a given row, this can circumvent the need to do semi-join or anti-join, if any of the disjunctive predicates evaluate to TRUE.

In one embodiment, an inline view may be generated during unnesting, and this view may be a candidate for cost-based join predicate push-down transformation, which allows the view to be joined with index access join.

In one embodiment, a query with multiple disjunctive predicates may be transformed using OR expansion in addition to being transformed to include a GDSJ or GDAJ. For example, a query such as SELECT*FROM T1 WHERE P1 OR P2 OR P3 can be transformed using OR expansion into SELECT*FROM T1 WHERE P1 UNION ALL SELECT*FROM T1 WHERE P2 AND NOT (P1) UNION ALL SELECT*FROM T1 WHERE P3 AND NOT (P1) AND NOT (P2). The UNION ALL operator combines the result sets of two or more queries and is not a join operation that is performed as part of a query. In one embodiment, an EXISTS-equivalent sub-query is a predicate of the query that remains after the query has been transformed using OR expansion.

Examples of Unnesting Exists or not Exists Subqueries

High-level concepts have been described for transforming a query by unnesting a predicate condition that is based on whether or not a result exists for a subquery of the predicate condition. Specific examples are provided herein to reinforce and deepen an understanding of these high-level concepts. However, the high-level concepts are not limited by these specific examples.

In various examples, an initial query representation represents an initial query having a correlated EXISTS-equivalent predicate. The initial query representation is transformed into a transformed query representation that does not have the correlated EXISTS-equivalent predicate. In the examples, the transformed query includes a GDSJ or a GDAJ. A GDSJ of "T1.x" and "T2.y" may be specified in a query representation as "T1.x GS=T2.y." A GDAJ of "T1.x" and "T2.y" may be specified in a query representation as "T1.x GA=T2.y."

Many users and applications generate queries that have a form of Query 1 or a form that is logically equivalent to or similar to Query 1, which is an example query that may be received by a query processor.

Example Received Query 1

```
SELECT T1.z, T1.k
FROM T1
WHERE T1.z > 5 and
    (T1.x is NULL OR EXISTS (SELECT 1
        FROM T2
        WHERE T2.p > 2 and
            T2.y = T1.x));
```

Query 1 selects rows from the z and k columns from table T1 when the rows satisfy a condition P. The condition P includes a first condition P1 in conjunction with a second condition P2. P1 requires that the z column for that row is greater than 5, and P2 is a complex condition that includes a disjunction of two conditions, P3 and P4. In other words, P2 is satisfied whenever either P3 or P4 is satisfied. P3 is satisfied when the x column for T1 is NULL for that row, and P4 is satisfied whenever a subquery, S, returns at least one row. The subquery, S, selects a value from table T2 where conditions P5 and P6 are satisfied. Condition P5 is satisfied when the p column of T2 is greater than 2 and condition P6 is satisfied when the y column of T2 equals the x column of T1.

In Query 1, if every value of T1.x is NULL, then the sub-query might never be evaluated. If there are non-NULL values, the sub-query is evaluated iteratively for each non-NULL value. In this case, evaluation of the sub-query is quite inefficient. For example, if 30% of the values are NULL, the non-NULL values would represent 70% of the values, and the sub-query would be evaluated separately for each of these non-NULL values. In the example, the predicate P3 references a same column as predicate P4, but the predicates need not reference same columns.

The above EXISTS subquery, S, cannot be unnested using regular semijoin, since it appears in a disjunction with another predicate, P3. With generalized disjunctive semi-join (GDSJ), the above query can be unnested to form transformed Query 2.

Example Transformed Query 2

```
SELECT T1.z, T1.k
FROM T1, T2 (T1.x IS NULL)
WHERE T1.z > 5 and T2.p > 2 and T1.x GS= T2.y;
```

Note that in Query 2, the disjunctive predicate(s) P3 ("T1.x IS NULL") is associated with the semi-joined table T2 and does not appear in the WHERE clause. The indication that P3 should be applied separately from the GDSJ may be stored syntactically in the query, as shown, or the indication may be stored in a structure such as a query tree. In the example, the indication is provided adjacent to base table T2 because base table T2 is from the sub-query of the EXISTS-equivalent predicate. The stored indication may be associated with this relevant semi-joined table such that the semi-joined table is created only for those rows of the base table(s) that do not already satisfy the other disjunctive predicate, P3. In Query 2, predicate P3 is shown in the FROM clause. Query 2 is executed by evaluating the join operation once for the rows that do not satisfy the disjunctive predicate(s) P3, rather than executing a sub-query multiple times for each row that does not satisfy the disjunctive predicate(s) P3.

The semantics of GDSJ can be described by the example of the Query 2. During execution of Query 2, the semi-join may be performed separately from or after the application of all conjunctive (i.e., and -ed) filter predicates on T1 and T2. In the following, the references to T1 and T2 refer to T1 and T2 after the application of the conjunctive filter predicates.

If T2 contains no rows, then return all the rows of T1 where any of the disjunctive predicates (e.g., T1.X IS NULL) evaluates to TRUE, and terminate.

For each row of T1, if any of the disjunctive predicates (e.g., T1.X IS NULL) evaluates to TRUE, return the T1 row, else perform semi-join of T1 and T2 (i.e., if T1.x has a match with any row of T2, then return the T1 row).

Query 3 is another example query that may be received by the query processor.

Example Received Query 3

```
SELECT T1.z, T1.k
FROM T1
WHERE T1.z > 5 and
    (T1.b > 7 OR
    NOT EXISTS (SELECT 1
        FROM T2
        WHERE T2.p > 2 and T2.y = T1.x));
```

Query 3 selects rows from the z and k columns from table T1 when the rows satisfy a condition P. The condition P includes a first condition P1 in conjunction with a second condition P2. P1 requires that the z column for that row is greater than 5, and P2 is a complex condition that includes a disjunction of two conditions, P3 and P4. In other words, P2 is satisfied whenever either P3 or P4 is satisfied. P3 is satisfied when the b column of T1 is greater than 7 for that row, and P4 is satisfied whenever a subquery, S, does not return any rows. The subquery, S, selects a value from table T2 where conditions P5 and P6 are satisfied. Condition P5 is satisfied when the p column of T2 is greater than 2 and condition P6 is satisfied when the y column of T2 equals the x column of T1.

In Query 3, if every value of T1.b is greater than 7, then the sub-query might never be evaluated. If this condition is not met for some values of T1.b, the sub-query is evaluated iteratively for each value that does not meet the condition. In this case, evaluation of the sub-query is quite inefficient.

The NOT EXISTS subquery, S, cannot be unnested using regular anti-join, since it appears in a disjunction with another predicate, P3. With generalized disjunctive antijoin (GDAJ), the above query can be unnested as transformed Query 4.

Example Transformed Query 4

```
SELECT T1.z, T1.k
FROM T1, T2 (T1.b > 7)
    WHERE T1.z > 5 and T2.p > 2 and T1.x GA= T2.y;
```

Note that in Query 4, the disjunctive predicate(s) P3 (T1.b>7) is associated with the anti-joined table T2 and does not appear in the WHERE clause. The indication that P3 should be applied separately from the GDAJ may be stored syntactically in the query, as shown, or the indication may be stored in a structure such as a query tree. The stored indication may be associated with the relevant anti-joined table such that the anti-joined table is created only for those rows that do not already satisfy the other disjunctive predicate, P3. In Query 4, predicate P3 is shown in the FROM clause. Query 4 is executed by evaluating the join operation once for the rows that do not satisfy the disjunctive predicate(s) P3, rather than executing a sub-query multiple times for each row that does not satisfy the disjunctive predicate(s) P3.

The semantics of GDAJ can be described by the example of Query 4. During execution of Query 4, the anti-join is performed separately from or after the application of all conjunctive (i.e., and -ed) filter predicates on T1 and T2. In the following, the references to T1 and T2 refer to T1 and T2 after the application of the conjunctive filter predicates.

If T2 contains no rows, then return all the rows of T1 and terminate.

For each row of T1, if any of the disjunctive predicates (e.g., T1.b>7) evaluates to TRUE, return the T1 row, else perform anti-join of T1 and T2 (i.e., if T1.x has no match with any rows of T2, then return the T1 row).

In the examples, a partial order is imposed on the semi-joined or anti-joined table, T, such that in every valid join permutation, T follows all the tables it is semi-joined or anti-joined to (i.e., the tables that the subquery is correlated with). The partial order ensures the tables on the left (and their column values) are available when T is being semi-joined or anti-joined.

This strategy is extended to also include in the partial order all the tables that are referenced in the disjunctive predicates. These tables precede the table being semi-joined or anti-joined in every valid join permutation.

Query 5 is another example query that may be received by a query processor.

Example Received Query 5

```
SELECT T1.c
FROM T1, T4
WHERE T1.z > 5 and T1.h = T4.h and
    (T4.d > 3 OR T1.c = 9 OR
    EXISTS (SELECT 1
        FROM T2
        WHERE T1.x > T2.x));
```

Query 5 selects rows from the c column from tables T1 and T4 when the rows satisfy a condition P. The condition P includes a first condition P1 in conjunction with a second condition P2 and a third condition P3. P1 requires that the z column for that row of T1 is greater than 5. P2 requires that the h column of T1 is equal to the h column of T4. P3 is a complex condition that includes a disjunction of three conditions, P4, P5, and P6. In other words, P3 is satisfied whenever any one or more of P4, P5, or P6 is satisfied. P4 is satisfied when the d column for T4 is greater than 3 for that row. P5 is satisfied when the c column of T1 is 9. P6 is satisfied whenever a subquery, S, returns at least one row. The subquery, S, selects a value from table T2 where condition P7 is satisfied. Condition P7 is satisfied when the x column of T1 is greater than the x column of T2.

The above query can be unnested using GDSJ as transformed Query 6.

Example Transformed Query 6

```
SELECT T1.c
FROM T1, T2 (T4.d > 3 OR T1.c = 9), T4
WHERE T1.z > 5 and T1.h = T4.h and T1.x GS> T2.x;
```

In Query 6, the imposition of partial order causes both T1 and T4 to precede T2 in every valid join permutation, although the EXISTS subquery is correlated only to T1. Note that in Query 6, the disjunctive predicate(s), P4 ("T4.d>3") and P5 ("T1.c=9"), are associated with the semi-joined table T2 and do not appear in the WHERE clause. The indication that P4 and P5 should be applied separately from the GDSJ may be stored syntactically in the query, as shown, or the indication may be stored in a structure such as a query tree. The stored indication may be associated with the relevant semi-joined table such that the semi-joined table is created only for those rows that do not already satisfy either of the other disjunctive predicates P4 or P5. In Query 6, predicates P4 and P5 are shown in the FROM clause.

Join Methods

A query optimizer may choose from among different available join methods to carry out a join operation. As described herein, some join methods are not available to some query formulations.

In a nested loops join method, a join operation is evaluated on a row-by row basis. In other words, during a join of T1 and T2, for each row of T1, the execution engine would scan T2 to determine whether T2 satisfies a join condition for that row.

In an index access join method, the execution engine may utilize indexes that existed in a database before execution of the query or subquery. For example, the database may already include indexes on the columns of T1 and/or T2 that are relevant to the join conditions. The execution engine leverages the index but still looks for these values on a row-by-row basis.

In a sort-merge join method, the execution engine may initially sort data in both of the tables that are being joined. The sorted data may be retained during execution of the query or subquery such that the sorted data does not need to be regenerated for each row. The sorted data may also be destroyed or retained once the query or subquery has been executed. For example, if evaluating an equality condition such as T1.dno=T2.id for a first row of T1 where T1.dno=5, the execution engine may look in the sorted data for T2.id=5. If the execution engine starts at a value below T2.id=5, the execution may save time by stopping the search once the execution engine reaches a value that is greater than T2.id=5. Similarly, if the execution engine starts at a value above T2.id=5, the execution engine may save time by stopping the search once the execution engine reaches a value that is less than T2.id=5.

In a hash join method, the execution engine may initially create a hash table that hashes values of either T1 into a hash bucket or values of T2 into a hash bucket. The hash tables may be retained during execution of the query or subquery such that the hash tables do not need to be regenerated for each row. The hash tables may also be destroyed or retained once the query or subquery has been executed. For example, if evaluating an equality condition such as T1.dno=T2.id for a first row of T1 where T1.dno=5, the execution engine may use a hash table to map T1.dno=5 to hash bucket X. For T2.id=5, the execution engine may be directed to look in the already existing hash bucket X, which may be significantly smaller than T2.

The sort-merge join method and the hash join method both involve a temporary organization of data from the first database object and the second database object, and utilization of the temporary organization of data for evaluation of multiple rows of the join operation. The temporary organization of data may involve the creation of a temporary database object such as a sorted table or a hash table. The temporary database object may be destroyed or retained after the join operation is completed. The nested loops and index access join methods do not create such data during query execution and cannot leverage such data to improve query execution.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
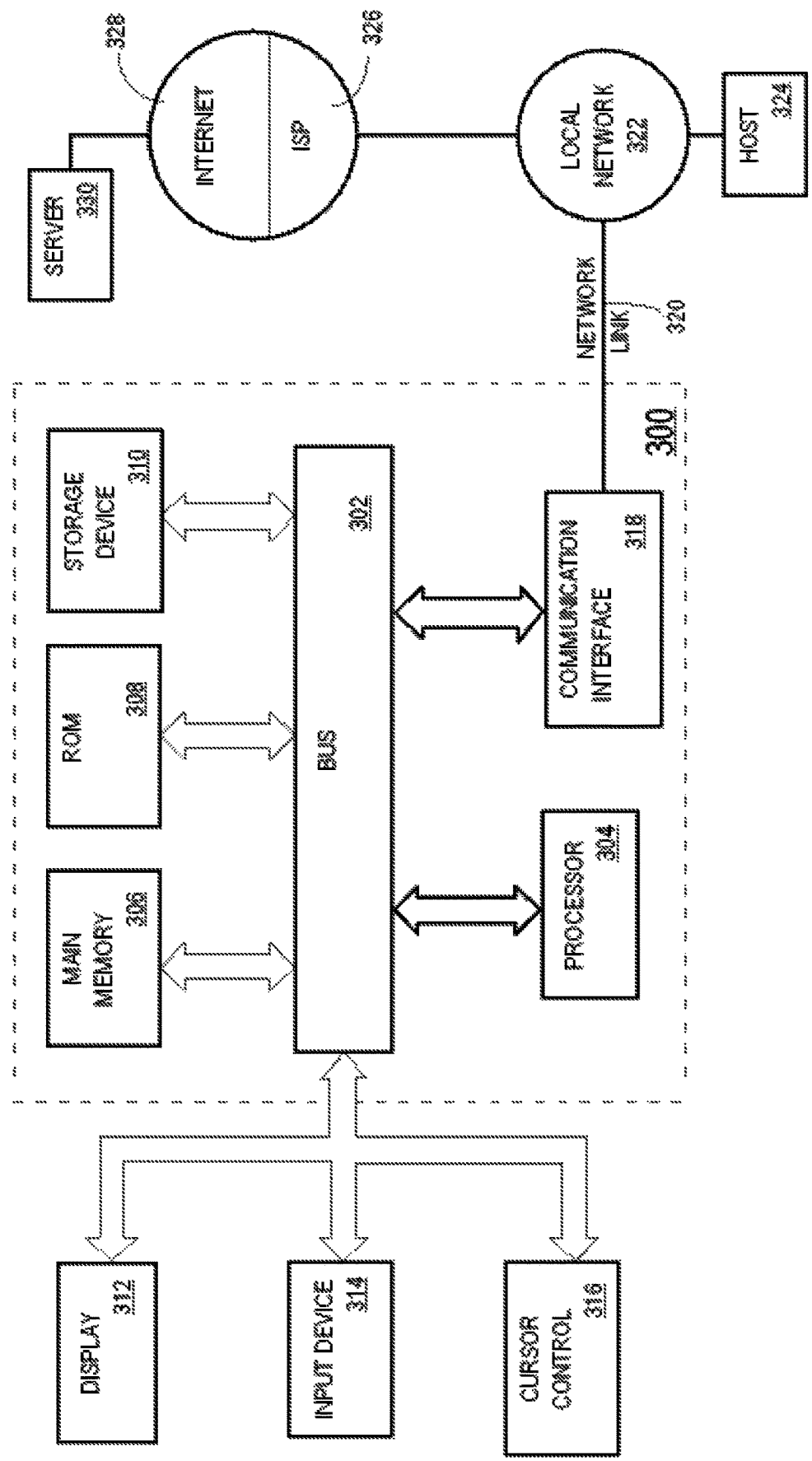
FIG. 3 illustrates an example computer system for performing various combinations of steps described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP)

326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a first representation of a first query, wherein the first query includes at least one disjunctive predicate condition in disjunction with a particular predicate condition, wherein the particular predicate condition is based on whether a result exists for a subquery of the particular predicate condition, wherein the subquery comprises a correlated predicate that refers to a second data object and a data object that is initially referenced outside of the subquery;
   transforming the first representation into a second representation of a second query;
   wherein the second query includes, in replacement of the particular predicate condition, a generalized disjunctive join operator that applies to:
      the at least one disjunctive predicate condition, and a join predicate for a specified join operation between the data object and the second data object;
   wherein the first representation is semantically equivalent to the second representation;
   storing a flag in association with a base table in the second representation to mark that the specified join operation should be applied to each row of the rows of the data object that do not satisfy the at least one disjunctive predicate condition;
   responsive to the flag, evaluating the generalized disjunctive operator, wherein evaluating the generalized disjunctive operator comprises:
      evaluating the at least one disjunctive predicate condition to determine:
         rows of the data object that satisfy the at least one disjunctive predicate condition;
         rows of the data object that do not satisfy the at least one disjunctive prediction condition;
      evaluating the specified join operation for each row of the rows of the data object that do not satisfy any of the at least one disjunctive predicate condition;
      wherein the join predicate for the specified join operation is not evaluated for the rows of the data object that satisfy one or more of the at least one disjunctive predicate condition;
   wherein the method is performed by one or more computing devices.

2. The method of claim 1, wherein the particular predicate condition comprises an EXISTS operator and the subquery.

3. The method of claim 1, wherein the particular predicate condition comprises a NOT EXISTS operator and the subquery.

4. The method of claim 1, wherein the particular predicate condition comprises an ANY, ALL, IN, or NOT IN operator and the subquery.

5. The method of claim 2, wherein the generalized disjunctive join operator is a generalized disjunctive semi-join operator and the specified join operation is a semi-join operation between the data object and the second data object.

6. The method of claim 3, wherein the generalized disjunctive join operator is a generalized disjunctive anti join operator and the specified join operation is an anti-join operation between the data object and the second data object.

7. The method of claim 1, wherein transforming the first representation into the second representation comprises storing the second query in temporary storage; and wherein applying the generalized disjunctive join operator comprises sending, to a query execution engine, the second query and an indication that the specified join operation should be applied to each row of the rows of the data object that do not satisfy the at least one disjunctive predicate condition.

8. The method of claim 1, wherein transforming the first representation into the second representation comprises storing, in temporary storage, information that describes the second query; and wherein applying the generalized disjunctive join operator comprises sending, to a query execution engine, the information that describes the second query.

9. The method of claim 1, wherein applying the generalized disjunctive join operator comprises causing at least one row of a base table that was referenced by the subquery in the first representation to be excluded from the specified join operation.

10. One or more non-transitory storage media storing instructions which, when executed by one or more computing devices, cause:
    receiving a first representation of a first query, wherein the first query includes at least one disjunctive predicate condition in disjunction with a particular predicate condition, wherein the particular predicate condition is based on whether a result exists for a subquery of the particular predicate condition, wherein the subquery comprises a correlated predicate that refers to a second data object and a data object that is initially referenced outside of the subquery;
    transforming the first representation into a second representation of a second query;
    wherein the second query includes, in replacement of the particular predicate condition, a generalized disjunctive join operator that applies to:
       the at least one disjunctive predicate condition, and a join predicate for a specified join operation between the data object and the second data object;
    wherein the first representation is semantically equivalent to the second representation;
    storing a flag in association with a base table in the second representation to mark that the specified join operation should be applied to each row of the rows of the data object that do not satisfy the at least one disjunctive predicate condition;

responsive to the flag, evaluating the generalized disjunctive operator, wherein evaluating the generalized disjunctive operator comprises:

evaluating the at least one disjunctive predicate condition to determine:

rows of the data object that satisfy the at least one disjunctive predicate condition;

rows of the data object that do not satisfy the at least one disjunctive prediction condition;

evaluating the specified join operation for each row of the rows of the data object that do not satisfy any of the at least one disjunctive predicate condition;

wherein the join predicate for the specified join operation is not evaluated for the rows of the data object that satisfy one or more of the at least one disjunctive predicate condition.

11. The one or more non-transitory storage media of claim 10, wherein the particular predicate condition comprises an EXISTS operator and the subquery.

12. The one or more non-transitory storage media of claim 10, wherein the particular predicate condition comprises a NOT EXISTS operator and the subquery.

13. The one or more non-transitory storage media of claim 10, wherein the particular predicate condition comprises an ANY, ALL, IN, or NOT IN operator and the subquery.

14. The one or more non-transitory storage media of claim 11, wherein the generalized disjunctive join operator is a generalized disjunctive semi-join operator and the specified join operation is a semi-join operation between the data object and the second data object.

15. The one or more non-transitory storage media of claim 12, wherein the generalized disjunctive join operator is a generalized disjunctive anti join operator and the specified join operation is an anti-join operation between the data object and the second data object.

16. The one or more non-transitory storage media of claim 10, wherein transforming the first representation into the second representation comprises storing the second query in temporary storage; and wherein applying the generalized disjunctive join operator comprises sending, to a query execution engine, the second query and an indication that the specified join operation should be applied to each row of the rows of the data object that do not satisfy the at least one disjunctive predicate condition.

17. The one or more non-transitory storage media of claim 10, wherein transforming the first representation into the second representation comprises storing, in temporary storage, information that describes the second query; and wherein applying the generalized disjunctive join operator comprises sending, to a query execution engine, the information that describes the second query.

18. The one or more non-transitory storage media of claim 10, wherein applying the generalized disjunctive join operator comprises causing at least one row of a base table that was referenced by the subquery in the first representation to be excluded from the specified join operation.

* * * * *